(12) United States Patent  
Fox

(10) Patent No.: US 7,043,867 B1
(45) Date of Patent: May 16, 2006

(54) FISH-BITE INDICATOR

(75) Inventor: Clifford Royston Fox, Chelmsford (GB)

(73) Assignee: Fox Design International Limited, Essex (GB)

( * ) Notice: Subject to any disclaimer, the term of this patent is extended or adjusted under 35 U.S.C. 154(b) by 1325 days.

(21) Appl. No.: 08/562,933

(22) Filed: Nov. 27, 1995

(30) Foreign Application Priority Data

Dec. 6, 1994 (GB) .................................. 9424597.4

(51) Int. Cl.
*A01K 97/12* (2006.01)

(52) U.S. Cl. .......................................................... 43/17
(58) Field of Classification Search ................... 43/17, 43/25

See application file for complete search history.

(56) References Cited

U.S. PATENT DOCUMENTS

| 4,731,946 | A | * | 3/1988 | Blythe | 43/17 |
| 5,010,678 | A | * | 4/1991 | Peck | 43/17 |
| 5,125,181 | A | * | 6/1992 | Brinton | 43/17 |
| 5,321,391 | A | * | 6/1994 | Fox | 43/17 |

FOREIGN PATENT DOCUMENTS

| DE | 3707988 | * | 9/1988 | 43/17 |
| EP | 0570117 | * | 11/1993 | 43/17 |
| GB | 2025741 | * | 1/1980 | 43/17 |
| GB | 1596260 | * | 8/1981 | 43/17 |
| GB | 2149631 | * | 6/1985 | 43/17 |
| GB | 2150402 | * | 7/1985 | 43/17 |
| GB | 2191372 | * | 12/1987 | 43/17 |
| GB | 2209261 | * | 5/1989 | 43/17 |
| GB | 2209911 | * | 6/1989 | 43/17 |
| GB | 2216372 | * | 10/1989 | 43/17 |
| GB | 2219181 | * | 12/1989 | 43/17 |
| GB | 2222060 | * | 2/1990 | 43/17 |
| GB | 2228397 | * | 8/1990 | 43/17 |
| GB | 2240019 | * | 7/1991 | 43/17 |
| GB | 2244195 | * | 11/1991 | 43/17 |
| GB | 2248755 | * | 4/1992 | 43/17 |

* cited by examiner

*Primary Examiner*—Kurt Rowan
(74) *Attorney, Agent, or Firm*—Clark & Brody

(57) ABSTRACT

A fish-bite indicator having a rotary part which is engaged by a fishing line when the indicator is in use. The vibration sensor is coupled to the rotary part to detect vibration thereof. As a result, vibration of the rotary part caused by a fish-bite can be detected by the vibration sensor whilst at the same time the part of the indicator which is engaged by such a line, being a rotary part, accommodates any longitudinal movement of the line.

11 Claims, 9 Drawing Sheets

FISH-BITE INDICATOR

The present invention relates to a fish-bite indicator.

Such indicators which have been adapted to detect vibration of a fishing line have comprised a part which engages such a line when the indicator is in use, and a vibration sensor coupled to the engagement part. In one previously proposed construction, the engagement part has comprised an antenna linked to a mechanical switch. More recently, the engagement part has comprised a notched member mounted at one end of a bimorph.

A problem encountered with the antenna construction is the difficulty with which the user can strike and lift his rod and line clear of the detector. A problem with the notched construction is the frictional contact between the engagement member and the line, especially in the event of longitudinal movement thereof. It is even possible, in some instances, for the line to bite into the engagement member.

The present invention seeks to provide a remedy.

Accordingly the present invention is directed to a fish-bite indicator having a rotary part which is engaged by a fishing line when the indicator is in use, and a vibration sensor coupled to the rotary part to detect vibration thereof, whereby vibration of the rotary part caused by a fish-bite can be detected by the vibration sensor whilst at the same time the part of the indicator which is engaged by such a line, being a rotary part, accommodates any longitudinal movement of the line.

Advantageously, the vibration sensor comprises piezoelectric material, and preferably it comprises a bimorph.

It is desirable for an alarm signal generator of the indicator to be coupled to the vibration sensor via threshold level adjustment means whereby the degree of sensitivity of the indicator to vibration of the line can be varied.

The indicator may further comprise a rotation sensor coupled to the rotary part to detect rotation thereof, whereby the same part of the indicator is engaged by such a line to enable detection of both vibration and longitudinal movement thereof. This enables a wider range of movement of the line to be detected, from a mere vibration, to a relatively great longitudinal movement.

Nonetheless, it is desirable to have an indicator in which the vibration sensitivity can be reduced substantially to zero for windy conditions or for fishing over the side of a boat. This enables the same indicator to be used in both still and unstable environments.

An alarm signal generator of the indicator may be coupled to the rotation sensor via a sensitivity adjustment whereby the degree of sensitivity of the indicator to rotation of the rotary part can be varied.

The rotation sensor means may be such as to produce a signal for every rotation of the rotary part through a predetermined angle.

The rotation sensor may comprise a counter constructed to issue an indicator signal in dependence upon each given count of signals it receives from the rotation sensor, which count is an integral number from one inclusive upwards, the counter being constructed so that the number of each given count is alterable, the indicator further comprising a manually adjustable member connected to the counter to enable that count to be altered thereby to enable the sensitivity of the indicator to rotation of its rotary part to be varied.

Examples of a fish-bite indicator made in accordance with the present invention will now be described with reference to the accompanying drawings, in which.

Figure 2:
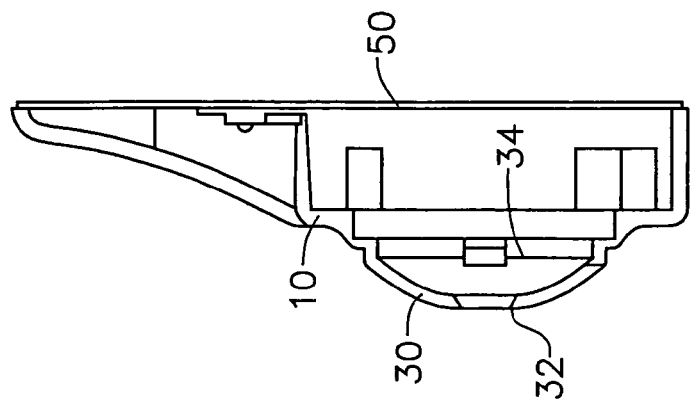
FIG. 2 shows a cross-sectional view of a front part of the housing shown in FIG. 1 taken along the line II—II thereof.

Many of the parts of the fish-bite indicators shown in the accompanying drawings correspond to what is shown and described in our EP-A-0 570 117A, and the whole of the text of that earlier patent specification is imported into the present specification by direct reference.

The fish-bite indicator shown in FIGS. 1 to 5 comprises a two-part synthetic plastics injection moulded housing 10 which may have an external screw-threaded metal shank (not shown) extending downwardly from its underside, to enable it to be secured to a bank stick.

The upper end of the housing 10 is bifurcated, so that it has two generally upwardly extending prongs 18, at the upper end of the left hand of which there is provided a light emitting diode (LED) 20.

Inwardly recessed ribs 22 are provided at the base of each prong 18 to reinforce the housing in those regions.

A slot 24 extends downwardly from the base of the bifurcation to expose a central portion 25 of a rotary part 26 contained within the housing. This central part is formed with a waist 28, so that it has the form of a pulley-wheel. A generally circular part 30 of the housing 10 is provided underneath the bifurcation, slightly off-set from the longitudinal bisecting plane thereof, and is provided with a central aperture 32 to permit sound to travel more readily through the housing 10 from a generally circular electromagnetic buzzer 34 positioned immediately inwardly of the diaphragm cover 30. Immediately above and slightly to the left of the diaphragm cover 30 there is an on/off/test switch 36 extending outwardly from the housing 10.

Four rotary knobs 38, 40, 42 and 43 are provided as a linear array immediately to the right of the diaphragm cover 30, these knobs being, respectively, a volume control, a pitch or tone control, a first sensitivity control and a second sensitivity control for the buzzer.

Figure 1:
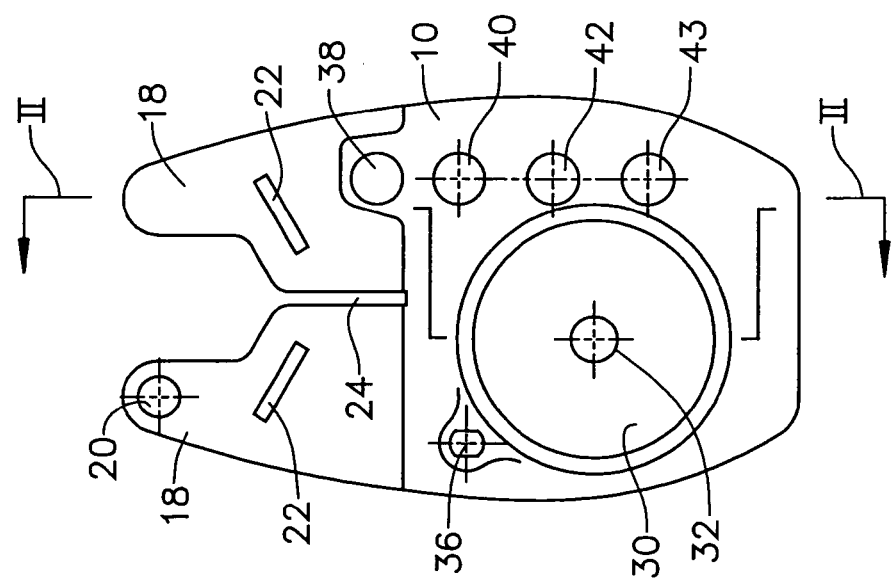
FIG. 1 shows a front elevational view of a housing of such an example.
Figure 3:
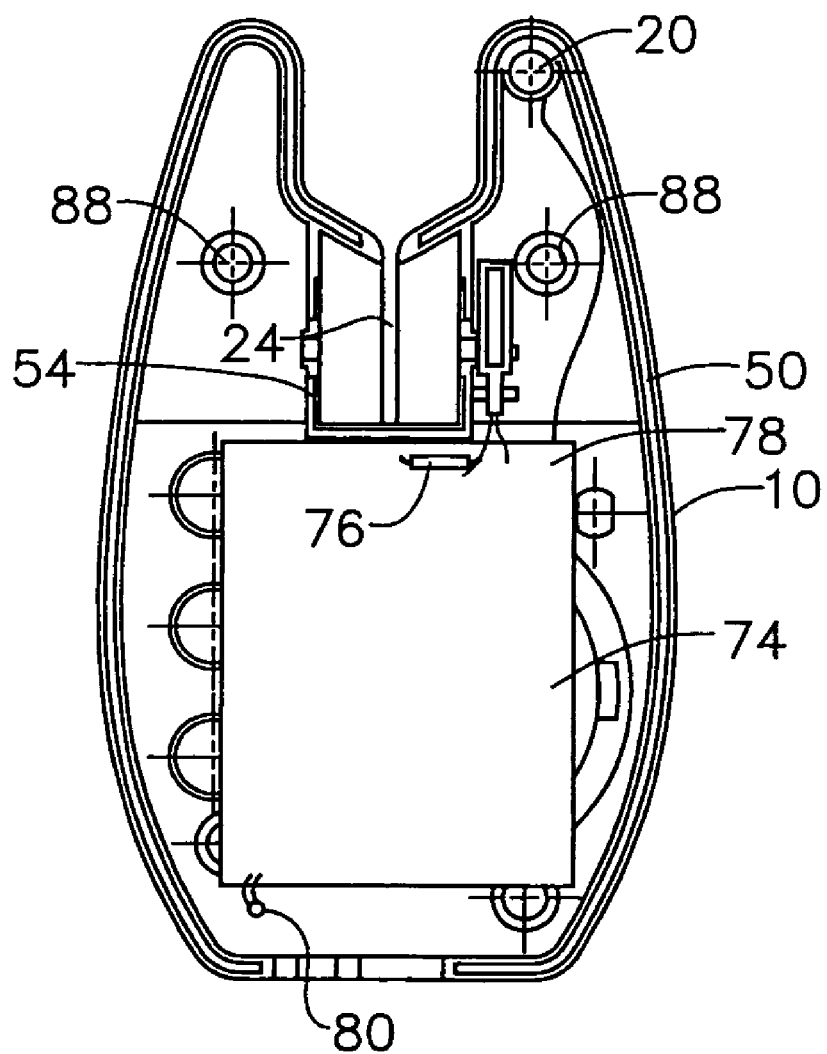
FIG. 3 shows a rear view of the front part of the housing shown in FIGS. 1 and 2, together with some of the interior parts of the indicator.

FIG. 3 shows the interior of that half of the two-part housing 10 which is visible in FIG. 1, with the other half of the housing 10 removed to reveal interior components of the fish-bite indicator. That edge of the housing half which faces the other half of the housing is formed with a longitudinally extending central rib 50. This engages a correspondingly formed longitudinally extending groove (not shown) formed on the corresponding edge of the other housing part.

Referring back to FIG. 3, an inner wall 54 is formed in the housing and generally surrounds the slot 24 to form half of an enclosure which contains the rotary part 26.

Figure 4:
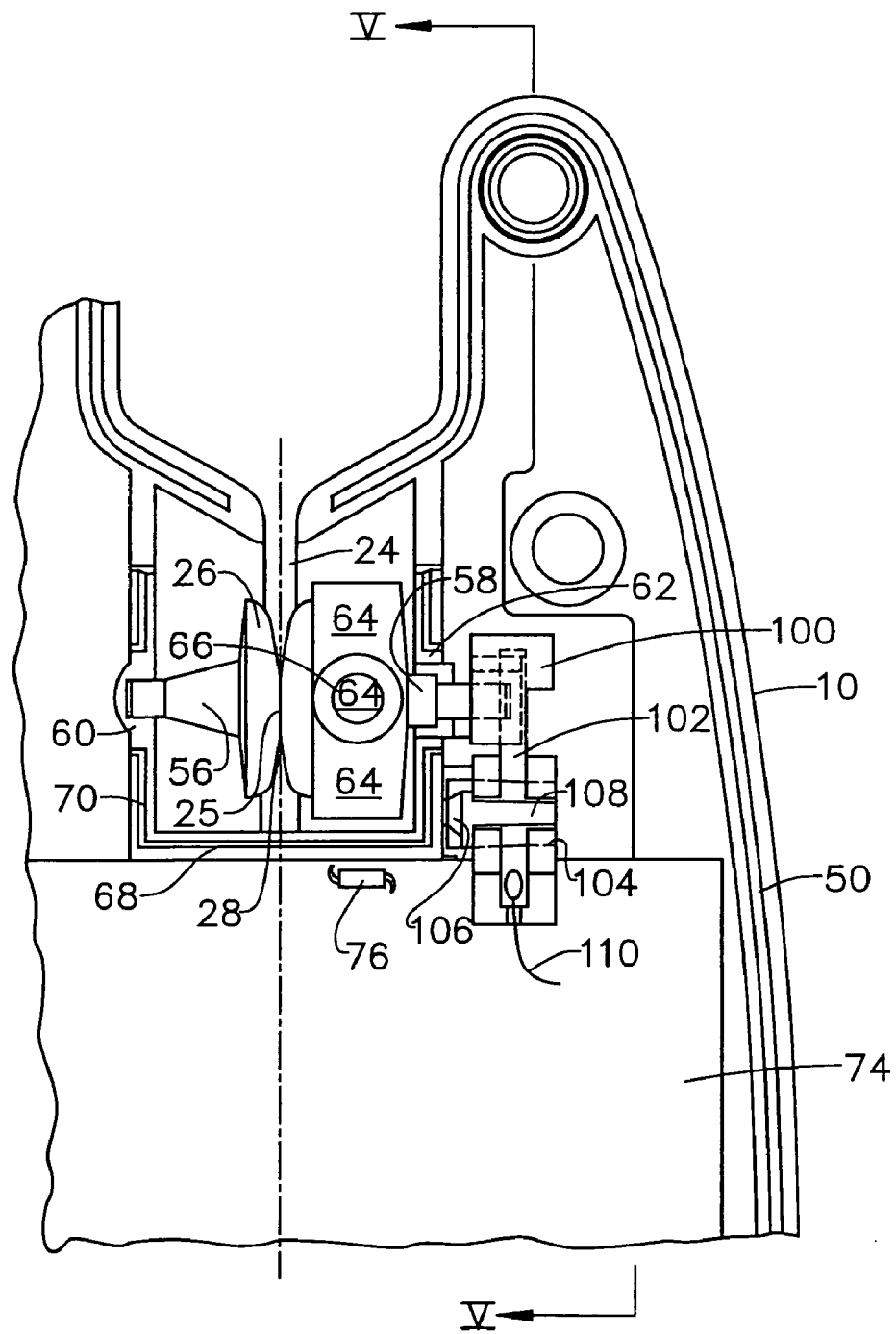
FIG. 4 shows a part that is shown in FIG. 3 on an enlarged scale, with further components not shown in FIG. 3.
Figure 5:
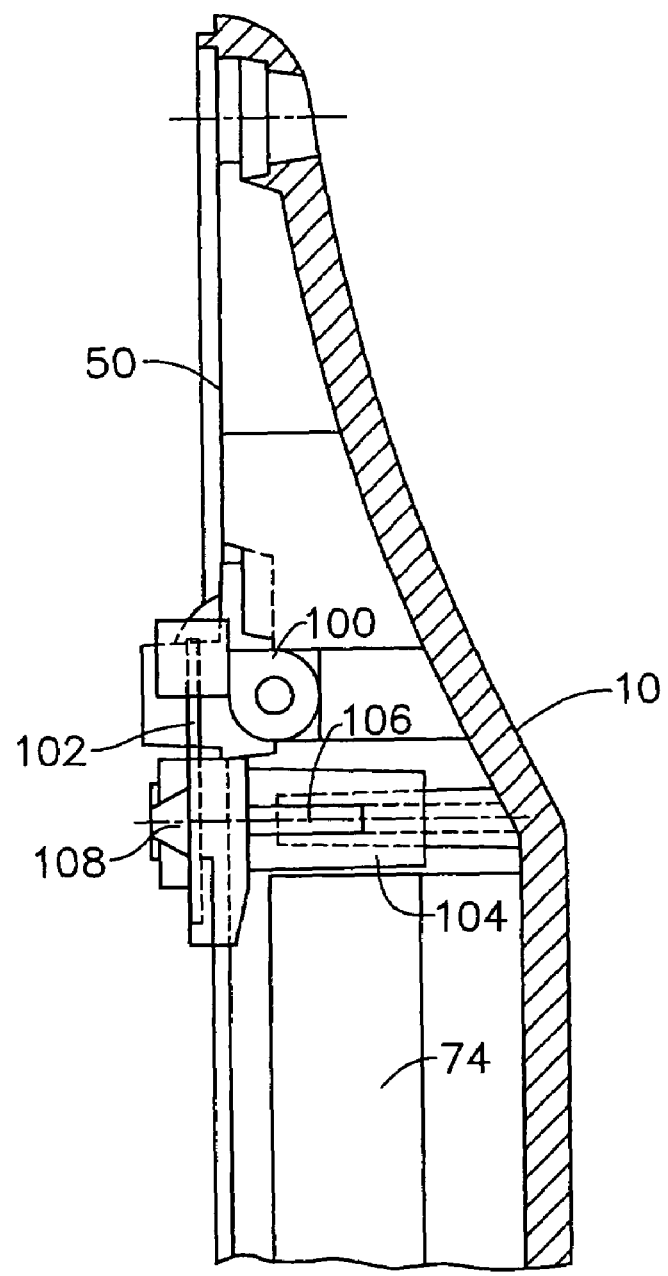
FIG. 5 shows a sectional view of parts shown in FIG. 4 along the meandering line V—V shown therein.

FIG. 4 shows that the rotary part has a tapering spindly portion 56 extending in an intended horizontal direction away from the central portion 25. A second spindle portion 58 of the rotary part 26 extends outwardly away from the central portion 25 in the opposite direction to that of the spindle portion 56. Respective recesses are formed in respective vertical parts of the inner wall 54 to provide rotary bearing means 60 and 62 respectively for the two spindle portions 56 and 58 of the rotary part 26.

Four cylindrical blocks 64 (only three of which are visible in FIG. 2) extend radially outwardly from the rotary axis of the rotary part 26, spaced apart at 90° intervals therearound, and house respective permanent magnets 66. The length of each cylinder 64 and permanent magnet 66 is such that, when the rotary part is rotated, the distal end of each magnet passes adjacent to a bottom 68 of the inner wall 54.

The edges of the inner wall 54 which face the other half of the housing 10, are provided with formations 70 which interengage with corresponding formations formed on corresponding inner edges of the other half of the rotary part enclosure, to form a seal therewith.

The slot 24 in each half of the housing 10 extends to the upper face of the bottom 68 of the enclosure so that any water which finds its way into the enclosure can readily drain outwardly therefrom.

From the foregoing description, it will be appreciated that the housing, together with the inner wall 54, defines a sealed interior. The latter contains a printed circuit board 74 which is fixed to the interior of the housing 10 and which includes a reed switch 76 mounted on the circuit board 74 immediately adjacent to the bottom 68 of the inner wall 54, within range of the magnetic fields of the permanent magnets 66 as the latter pass by the bottom 68 when the rotary part 26 rotates.

The printed circuit board 74 is connected to the LED 20 via leads 78, and power leads 80 extend from the printed circuit board 74 to a 9 volt alkaline battery (not shown).

The on/off/test switch 36, the buzzer having the buzzer diaphragm 34, and each of the four control knobs 38, 40, 42 and 43 are all connected to the circuit board 74 to define circuitry shown in greater detail, and described hereinafter, with reference to FIGS. 9 and 10.

An extension socket (not shown) may extend through the bottom of the housing 10 and is also connected to the printed circuit board 74.

Internally screw-threaded horizontally extending portions 88 are formed in the interior of the housing part shown in FIG. 3, and apertures (not shown) formed in the other housing part are in registration with the portions 88 when the two housing parts are brought together, enable screws (not shown) to secure those two housing parts tightly together with the rib 50 engaging the groove in the other housing part.

The spindle portion 58 extends beyond the inner wall 54 and is secured to an upper mounting block 100 for a bimorph 102. A lower mounting block 104 for the bimorph 102 is secured to the wall 54 via a horizontally extending dovetail joint 106. The block 104 embraces the bimorph 102 around its further side as viewed in FIG. 4, and a finger 108 of the block 104 abuts the front side of the bimorph 102, as viewed in FIG. 4, to hold the lower part thereof relatively rigidly in an upright position. The upper mounting block 100, whilst being fixed securely to the spindle portion 58, is free to move with that spindle portion to the extent that tolerances between the portions of the wall 54 which are immediately adjacent to that spindle portion allow. As a result, any vibration of the rotary part is transmitted to the bimorph 102. This in turn will piezo-electrically generate a signal delivered to the output leads 110 from the bimorph 102.

Figure 7:
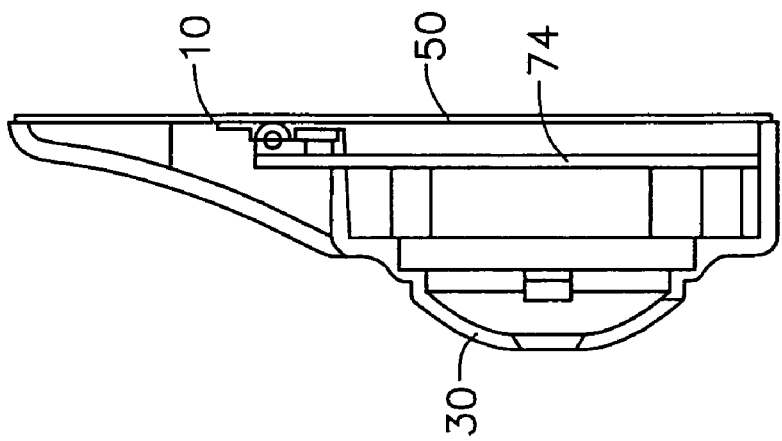
FIGS. 6 to 8 show views corresponding to FIGS. 1 to 3, of a modified construction of indicator.
Figure 6:
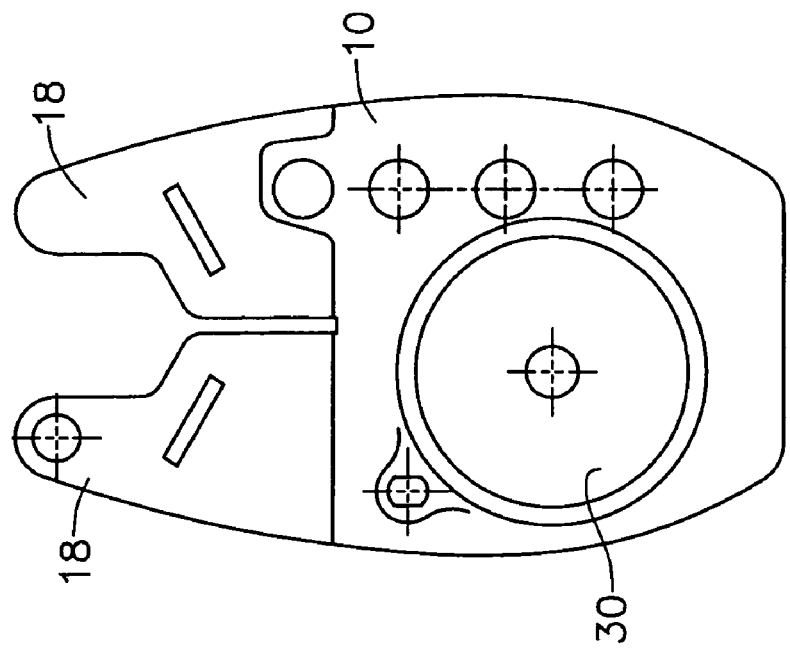
Figure 8:
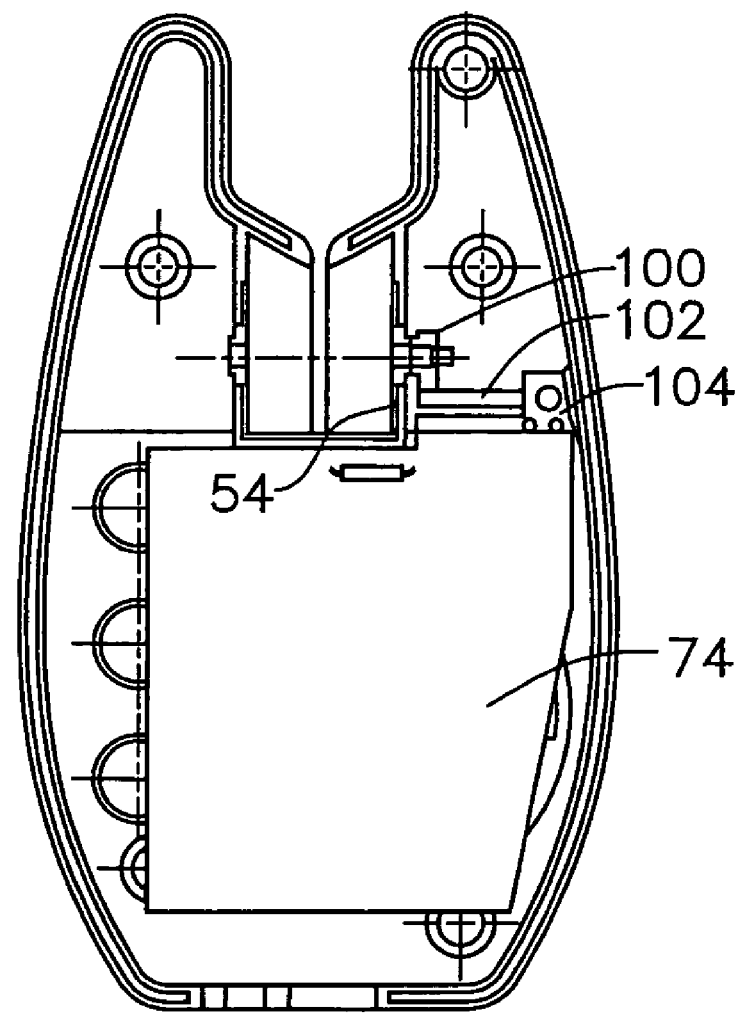

In the arrangement shown in FIGS. 6 to 8, the bimorph 102 is arranged horizontally, with the lower mounting block 104 being positioned further away from the wall 54 than in the FIGS. 1 to 5 embodiment, to accommodate the horizontal extent of the bimorph 102.

Figure 9:
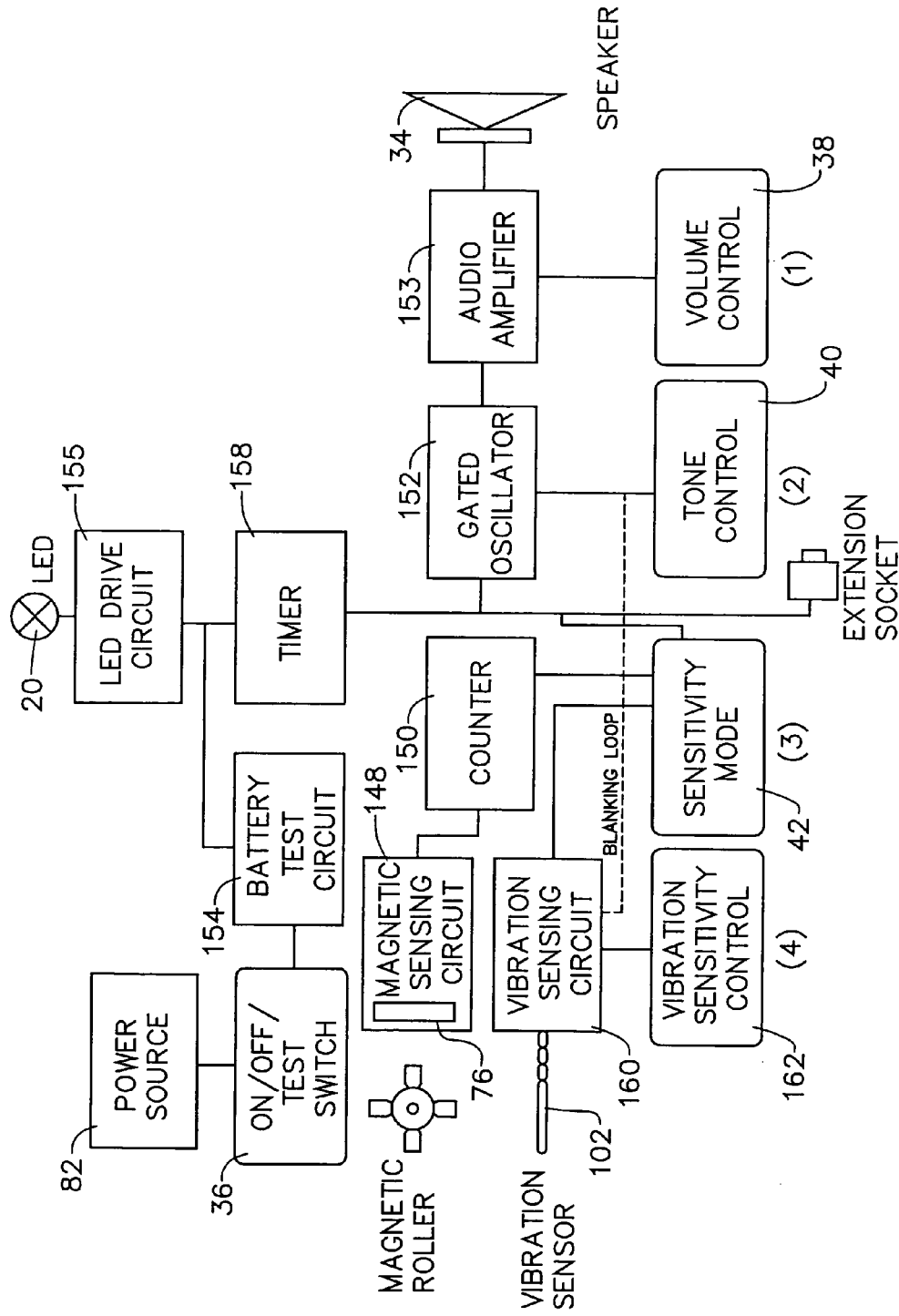
FIG. 9 shows an electrical block circuit diagram of the indicator shown in FIGS. 1 to 3 or FIGS. 6 to 8.

Much of the circuitry shown in FIG. 9 corresponds to that of FIG. 4 in EP-A-0 570 117.

Thus, the reed switch 76 is part of a magnetic sensing circuit 148 connected to the buzzer 34 having a diaphragm 32 via a digital counter 150, a sensitivity mode selector 42, and a gated oscillator 152 connected in series in that order passing from the switch 76 to the buzzer 34. The output of the oscillator 152 is thus buffered. In addition, an audio amplifier 153 is connected between the gated oscillator 152 and the buzzer 34.

The volume control 38 and the pitch (or tone) control 40 are connected directly to the audio amplifier 153 and the gated oscillator 152 respectively to vary the volume and pitch (or tone) respectively of the sound emitted by the buzzer having the diaphragm 34.

The sensitivity control 42 is connected to the counter 150. Adjustment of the sensitivity control 42 as a result alters the number of pulses the counter receives from the reed switch 76 before the selector 42 issues a square-wave pulse to the gated oscillator 152.

As also shown in FIG. 9, the battery 82 is connected to power the various parts of the circuitry via the on/off/test switch 36. A further output from that switch is connected to a battery test circuitry 154 having an output connected to the LED 20 via a drive circuit 155. When the switch 36 is pushed to a test position (away from which it is resiliently urged by means (not shown) to its off position), the battery test circuit 154 measures the voltage from the battery 82 and causes the LED 20 to flash for about one second if the power provided by the battery 82 is acceptable.

Otherwise the LED will not be illuminated at all for the duration of the test. A fixed delay off type of timer 158 connected between the output of the counter 150 and the LED 20 latches to the on condition, to switch the LED on, for a predetermined duration of for example ten seconds upon receipt of a pulse from the counter 150.

Preferably, the circuitry comprises microprocessors and other integrated semi-conductor microchips duly programmed to operate in accordance with the manner of operation described herein.

The bimorph 102 is connected to a vibration sensing circuit 160 which is provided with a sensitivity control 162. The latter sets the threshold of signal required from the bimorph 102 before the vibration sensing circuit will provide an output signal. The latter is connected to the gated oscillator 152 via the sensitivity control 42.

Figure 10:
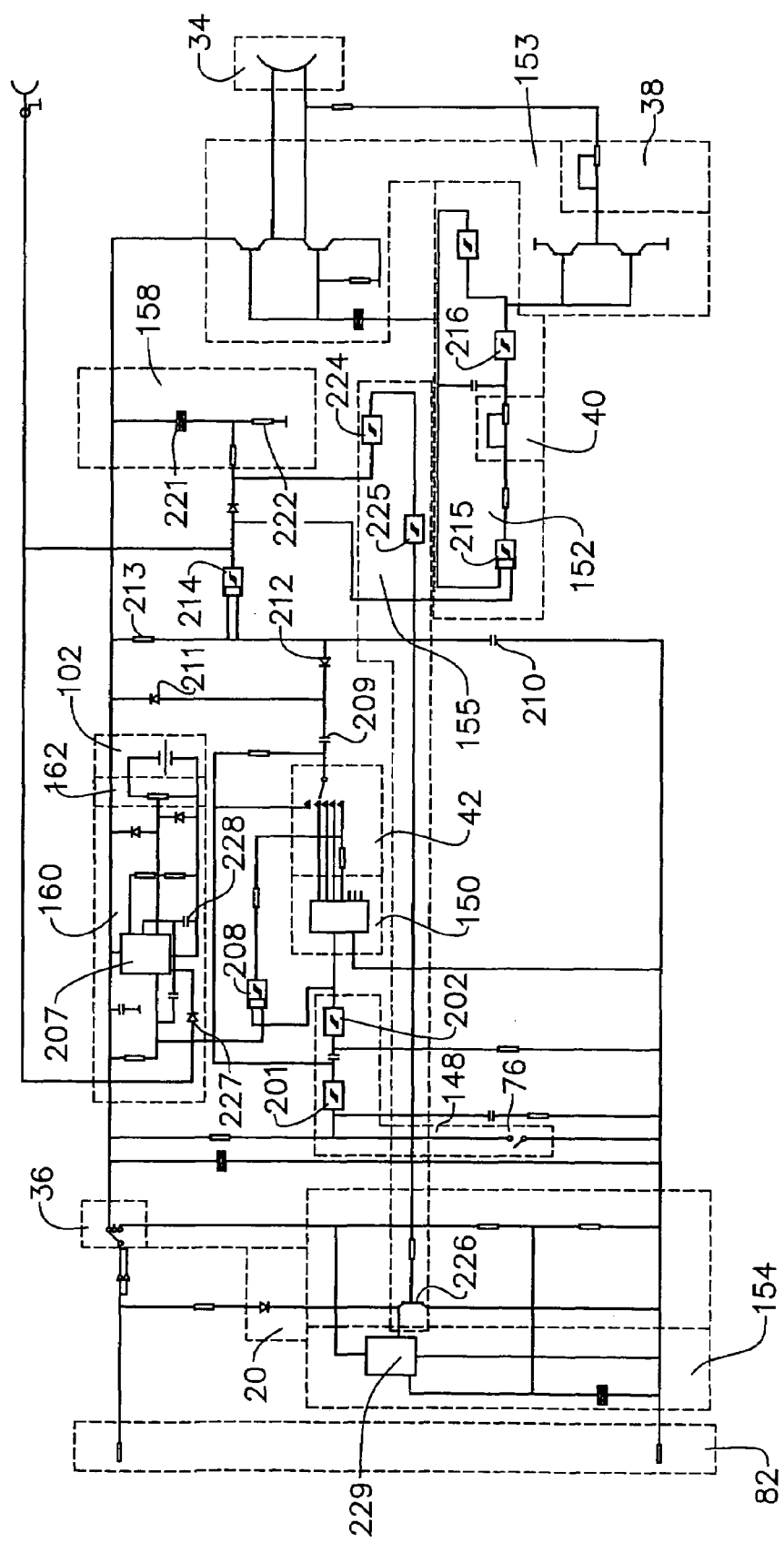
FIG. 10 is a circuit diagram showing the circuit of FIG. 9 in greater detail.

Further details of the circuitry depicted merely in block circuit form in FIG. 9, are shown in FIG. 10. Components shown in FIG. 10 which constitute a given part of the block circuit shown in FIG. 9 are enclosed within a broken line box bearing the corresponding reference number.

It will be noted that the magnetic sensing circuit comprises the reed switch 76 connected in series with a debounce gate 201 and a buffer gate 202 connected in that order in series with one another. The output from the buffer gate 202 is connected to an input of the counter 150.

The vibration sensitivity circuit comprises the bimorph 102, across which is connected a potentiometer constituting the vibration sensitivity control 162. Its centre tap is connected to an inverting input of a comparator 207. The non-inverted input to the comparator 207 is maintained at a reference voltage via a resistance bridge. The output from the comparator 207 is connected to a NAND gate 208 having its other input connected to the output from the magnetic sensing circuit. The output from the NAND gate 208 is connected to a lowermost output line from the counter 150. This represents a line for a count of one, that is to say a line which gives an output pulse every time the counter 150 receives an input pulse. It therefore represents the most sensitive setting for the sensitivity mode switch 42. The outputs from the counter 150 are connected via the sensitivity mode selector 42 in the form of a multi-position switch, a timing circuit comprising the capacitors 209 and 219, the diodes 211 and 212 and a resistor 213, to a schmitt NAND gate 214. The output from this gate is delivered to the timer 158 which in turn has an output connected to both the light emitting diode 20 via the switch 36 and the audio signal generating circuits. These comprise the gated oscillator 152 which incorporates the tone (or pitch) control 40.

The latter is a simple potentiometer connected between two of the gates 215 and 216, in series therewith, of the gated oscillator 152.

The output from the gate 214 is also connected to the timer 158 formed by a capacitor 221 and a resistor 222 which drive the LED 20 via the LED drive circuit 155 constituted by two gates 224 and 225 and a transistor 226.

The audio amplifier 153 comprises a bridge-type driver circuit connected to the output of the gated oscillator 152. The audio amplifier has its outputs connected to the buzzer 34 which is constituted by a piezo speaker.

When the indicator is in use, a line of a fishing rod passes over the rotary part 26. Any longitudinal movement of the line will therefore cause the reed switch 76 to be opened and closed at a frequency depending upon the speed of movement of the line. The pulses thus produced are debounced and buffered by the gates 201 and 202 respectively of the magnetic sensing circuit. These pulses are fed to the input of the counter 105, the outputs of which are connected to the selector 42. A first of these four outputs provide a pulse every time the counter receives a pulse, the second provides a pulse after every two pulses received by the counter, the third output after four received pulses and the fourth after eight. This effectively provides a sensitivity control, as progressively greater longitudinal movements of the line are required to produce an output as the switch position is raised. The final switch position selects the vibration sensing mode, in which the output from the vibration sensing circuit is connected, via the NAND gate 208, to trigger the timer 158 and also the gated oscillator 152. The LED 20 and the buzzer 34 will therefore emit visual and audio signals respectively directly a vibration of the line is transmitted through the rotary part 26 and thence to the bimorph 102.

The manner in which this is achieved is by the piezoelectrically generated voltage developed by the bimorph 102 being applied across the potentiometer 162 thus changing the potential at the centre tapping thereof. Adjustment of the position of that centre tapping thus constitutes the vibration sensitivity control, since it determines the level of voltage, for a given voltage developed by the bimorph 102, forwarded to the comparator 207. The non-inverting input of the comparator 207 is maintained at a constant voltage $V_{REF}$ determining the smallest voltage which will be detected. Therefore, whenever vibration of the line occurs which is such as to produce a voltage across the sensor in excess of $V_{REF}$, the output of the comparator will momentarily change state. Pulses from the output of the comparator are combined with pulses from the magnetic sensing circuit 148 via the NAND gate 208 which forwards these pulses on to the last position of the multi-position switch sensitivity selector 204. The illustrated resistors 231, 232 and 233 connected respectively between the output of the debounce gate 201 and output of the selector 204, between the gate 208 and the last output from the selector 204, and between the output corresponding thereto from the counter 203 and that last output, are zero ohmed. They are used to configure various optional features.

Pulses from the selector 42 are fed to the timing circuit comprising the capacitors 209 and 210 and the diodes 211 and 212 and resistor 213. An output signal from this timer circuit is fed to the schmitt NAND gate 214. The output from that gate is used to trigger the audio gated oscillator 152 constituted by the gates 215, 216 and 217. The frequency of that gated oscillator may be varied by the potentiometer 218 to alter the tone (or pitch) of the audio signal emitted by the buzzer 34. The output from the gated oscillator 152 is fed to the bridge type driving circuit to drive the buzzer 34. The volume of its output can be controlled by way of the potentiometer 220. The output from the gate 214 also initialises the timer 158 formed by the capacitor 221 and the resistor 222 which drive the light emitting diode 20 via the LED drive circuit 155 constituted by the gates 224 and 225 and the transistor 226.

To prevent acoustic feed-back when the indicator is in the vibration sensing mode, the output of the gate 214 is also connected back to the non-inverting input of the comparator 207 via a diode 227. This effectively mutes the input for the duration of the pulses. The capacitor 228 extends the length of the pulse slightly to allow for any resonance in the housing of the indicator to die away after signals to the speaker 34 have ceased.

The battery test circuit 154, comprising the integrated circuit 229 and its associated components, is enabled by a switching of the switch 36 to its third position, that is to say its test position. The light emitting diode 20 will be illuminated provided the battery voltage is acceptable.

Figure 11:
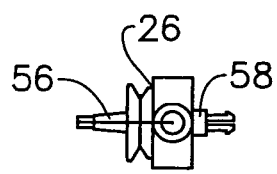
FIG. 11 shows a front view of a possible line-engagement component of the indicator.
Figure 12:
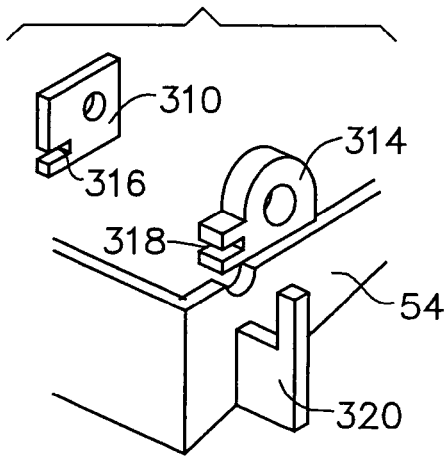
FIG. 12 shows one possible form of mounting means for the engagement part shown in FIG. 11.

Numerous variations and modifications of the illustrated indicator will readily occur to a person of ordinary skill in the art without taking the resulting construction outside the scope of the present invention. For example, as shown in FIG. 11, the second spindle portion 58 of the rotary part 26 may be in two part form spaced apart by an axially extending slot, with enlarged portions at their free ends, to provide a snap-fitting feature. Thus such a rotary part 26 may have its first spindle portion 56 inserted into a first trunnion portion 310 as shown in FIG. 12, and then another trunnion portion 314 may be snap fitted on to the second spindle portion 58. This second trunnion portion 314 may then be secured to the inner wall 54 of the indicator.

In the modification shown in FIG. 12, the bimorph 102 is received in respective slots 316 and 318 respectively of the trunnion parts 310 and 314. A further mounting portion 320 is secured to the inner wall 54 and provides a mount for the electrical connection to the bimorph 102 (not shown in FIG. 12).

Figure 13:
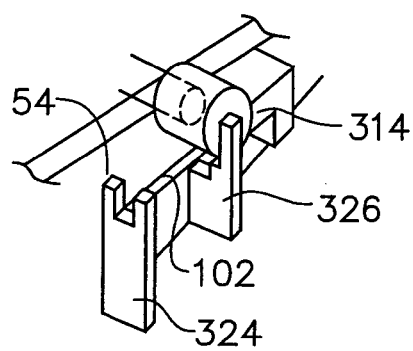
FIG. 13 shows an alternative construction for such mounting means.
Figure 14:
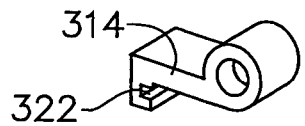
FIG. 14 shows a perspective view, from the opposite side, of a part shown in FIG. 13.

In the modification shown in FIGS. 13 and 14, the second trunnion part 314 is generally L-shaped, and has a groove 322 on the inner side of its limb further from the actual trunnion. This receives one end of a bimorph 102 the other end of which is received in a mounting 324 also secured to the inner wall 54 of the indicator. A further mounting 326 restricts downward motion of this assembly.

Figure 15:
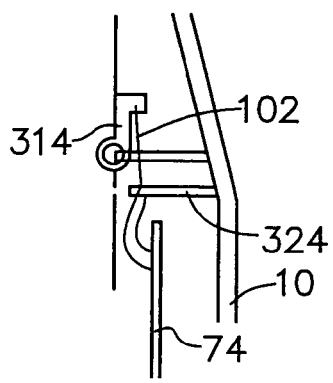
FIGS. 15 and 16 are diagrams of alternative arrangements of the components shown in FIG. 13.
Figure 16:
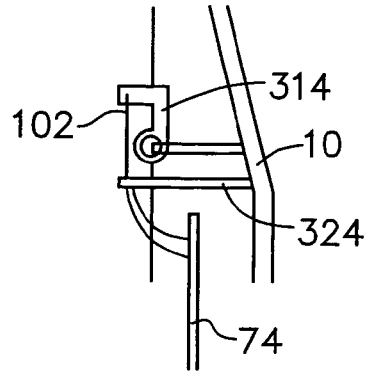

The FIG. 13 arrangement is shown as a side view in FIG. 15 which also shows the leads from the bimorph 102 connected to the printed circuit board 74. FIG. 16 shows a further arrangement in which the bimorph 102 is held on the side of the rotary part axis further from the printed circuit board 74.

I claim:

1. A fish-bite indicator comprising: a rotary part mounted for rotation about a first axis and which is engaged by a fishing line when the indicator is in use, and a vibration sensor coupled to the rotary part to detect vibration thereof in a direction parallel to said axis, said rotary part being disposed between said fishing line and said vibration sensor when the indicator is in use, whereby vibration of the rotary part caused by a fish-bite can be detected by the vibration sensor whilst at the same time the rotary part of the indicator which is engaged by such line, being a rotary part, accommodates any longitudinal movement of the line, in which the vibration sensor comprises piezoelectric material.

2. A fish-bite indicator comprising: a rotary part mounted for rotation about a first axis and which is engaged by a fishing line when the indicator is in use, and a vibration sensor coupled to the rotary part to detect vibration thereof in a direction parallel to said axis, said rotary part being disposed between said fishing line and said vibration sensor when the indicator is in use, whereby vibration of the rotary part caused by a fish-bite can be detected by the vibration sensor whilst at the same time the rotary part of the indicator which is engaged by such line, being a rotary part, accommodates any longitudinal movement of the line, in which the vibration sensor comprises a bimorph.

3. A fish-bite indicator comprising a first rotary part adapted to be engaged by a fishing line when the indicator is in use, said rotary part being mounted for rotation about a first axis in response to movement of said fishing line in a direction transverse to said axis, and a vibration sensor coupled to the rotary part to detect vibration of the rotary part in the direction of said axis and imparted to the rotary part by vibrations of said fishing line, whereby vibration of said fishing line caused by a fish bite can be detected by the vibration sensor while, at the same time, the rotary part of the indicator, which is engaged by such line, rotates in response to longitudinal movement of the line.

4. A fish-bite indicator according to claim 3 further in which the vibration sensor comprises piezoelectric material.

5. A fish-bite indicator according to claim 3, in which the vibration sensor comprises a bimorph.

6. A fish-bite indicator according to claim 3, further comprising an alarm signal generator of the indicator coupled to the vibration sensor via threshold level adjustment means whereby the degree of sensitivity of the indicator to vibration of the line can be varied.

7. A fish-bite indicator according to claim 3, further comprising a rotation sensor coupled to the rotary part to detect rotation thereof, whereby only the rotary part of the indicator is engaged by said fishing line to enable detection of both vibration and longitudinal movement thereof.

8. A fish-bite indicator according to claim 7, in which the vibration sensitivity can be reduced substantially to zero for windy conditions or for fishing over the side of a boat.

9. A fish-bite indicator according to claim 7, further comprising an alarm signal generator coupled to the rotation sensor via a sensitivity adjustment whereby the degree of sensitivity of the indicator to rotation of the rotary part can be varied.

10. A fish-bite indicator according to claim 7, in which the rotation sensor is such as to produce a signal for every rotation of the rotary part through a predetermined angle.

11. A fish-bite indicator according to claim 7, in which the rotation sensor comprises a counter constructed to issue an indicator signal in dependence upon each given count of signals it receives from the rotation sensor, which count is an integral number from one inclusive upwards, the counter being constructed so that the number of each given count is alterable, the indicator further comprising a manually adjustable member connected to the counter to enable that count to be altered thereby to enable the sensitivity of the indicator to rotation of its rotary part to be varied.

* * * * *